United States Patent
Lee et al.

(10) Patent No.: US 9,323,648 B2
(45) Date of Patent: Apr. 26, 2016

(54) AUTOMATIC TESTING APPARATUS FOR EMBEDDED SOFTWARE AND AUTOMATIC TESTING METHOD THEREOF

(71) Applicant: Samsung Electronics Co., Ltd., Suwon-si (KR)

(72) Inventors: Byeong-hu Lee, Hwaseong-si (KR); Tai-ryong Kang, Suwon-si (KR); Sang-deok Kim, Suwon-si (KR); Yong-hee Park, Suwon-si (KR); Sang-rae Lee, Suwon-si (KR); Jae-hoon Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/026,042

(22) Filed: Sep. 13, 2013

(65) Prior Publication Data
US 2014/0123111 A1    May 1, 2014

(30) Foreign Application Priority Data
Oct. 26, 2012 (KR) .................. 10-2012-0119604

(51) Int. Cl.
*G06F 9/44* (2006.01)
*G06F 11/36* (2006.01)
(Continued)

(52) U.S. Cl.
CPC ........ *G06F 11/3672* (2013.01); *G06F 11/3684* (2013.01); *G06F 11/3688* (2013.01);
(Continued)

(58) Field of Classification Search
CPC ............ G06F 11/3672; G06F 11/3684; G06F 11/3688; H04N 17/004
See application file for complete search history.

(56) References Cited

U.S. PATENT DOCUMENTS 5,371,878 A * 12/1994 Coker .......................... 703/28
6,249,882 B1 * 6/2001 Testardi .............. G06F 11/3672
714/38.14

(Continued)

FOREIGN PATENT DOCUMENTS

| KR | 10-2008-0052341 | 6/2008 |
| KR | 10-2010-0041447 | 4/2010 |
| WO | 2007/137082 A2 | 11/2007 |

OTHER PUBLICATIONS

Jason McDonald et al., "Module Testing Embedded Software—an industrial pilot project" [Online], IEEE 2010, pp. 233-238, [Retrieved from Internet on Dec. 11, 2015] , <http://ieeexplore.ieee.org/stamp/stamp.jsp?tp=&arnumber=930182>.*

(Continued)

*Primary Examiner* — Thuy Dao
*Assistant Examiner* — Ziaul A Chowdhury
(74) *Attorney, Agent, or Firm* — Staas & Halsey LLP

(57) ABSTRACT

An automatic test apparatus for embedded software and an automatic testing method thereof, the automatic testing apparatus for embedded software, includes an output detector which collects interface status information in accordance with data transmission/reception from at least one of first and second electronic devices respectively loaded with first and second embedded software and exchanging data therebetween, and extracts a keyword from the collected interface status information, a scenario composer which uses identification information about the first and second embedded software and the extracted keyword, and composes a scenario corresponding to a predetermined event status and a control command generator which generates a control command to reproduce the event status based on the composed scenario. Thus, it is possible to previously detect unpredictable and predictable problems that may occur in interaction between the plurality of embedded software, interface operation to transmit and receive data, etc., and reproduce them.

19 Claims, 4 Drawing Sheets

(51) Int. Cl.
*H04N 17/00* (2006.01)
*H04N 21/442* (2011.01)
*H04N 21/4363* (2011.01)
*H04N 21/443* (2011.01)

(52) U.S. Cl.
CPC ......... *H04N17/004* (2013.01); *H04N 21/4424* (2013.01); *H04N 21/43635* (2013.01); *H04N 21/443* (2013.01)

(56) References Cited

U.S. PATENT DOCUMENTS

| | | | | |
|---|---|---|---|---|
| 6,261,229 | B1* | 7/2001 | Gotschim | H04N 17/004 348/E17.003 |
| 6,408,403 | B1* | 6/2002 | Rodrigues | G06F 11/3688 714/38.11 |
| 8,887,135 | B2* | 11/2014 | Banerjee | G06F 11/3684 717/106 |
| 9,195,571 | B2* | 11/2015 | Lee | G06F 11/3684 |
| 2003/0138765 | A1* | 7/2003 | Bowers | G06F 11/3684 434/322 |
| 2004/0025083 | A1* | 2/2004 | Nanja | G06F 11/3684 714/35 |
| 2004/0068685 | A1* | 4/2004 | Yuan et al. | 714/741 |
| 2004/0199600 | A1* | 10/2004 | Dorundo | G06F 9/4401 709/216 |
| 2006/0129990 | A1* | 6/2006 | Flanagan et al. | 717/124 |
| 2006/0143523 | A1* | 6/2006 | You et al. | 714/28 |
| 2006/0179351 | A1 | 8/2006 | Nathan et al. | |
| 2006/0274072 | A1* | 12/2006 | Bhatia | G06F 11/3688 345/501 |
| 2008/0010539 | A1* | 1/2008 | Roth | 714/38 |
| 2008/0270840 | A1* | 10/2008 | Choi | G06F 11/3688 714/38.13 |
| 2010/0087935 | A1* | 4/2010 | Pettus et al. | 700/83 |
| 2010/0146487 | A1* | 6/2010 | Chun | G06F 11/3688 717/126 |
| 2012/0005665 | A1* | 1/2012 | Repellin | 717/168 |
| 2012/0054716 | A1* | 3/2012 | Tailliez | G06F 8/61 717/107 |
| 2012/0084684 | A1* | 4/2012 | Kota | G06F 11/3672 715/762 |
| 2012/0136612 | A1* | 5/2012 | Vanderhoff | H04N 17/004 702/119 |

OTHER PUBLICATIONS

Francesco Sechi et al., "Design of a Distributed Embedded System for Domotic Applications", [Online], IEEE 2008, pp. 427-431, [Retrieved from Internet on Dec. 11, 2015], <http://ieeexplore.ieee.org/stamp/stamp.jsp?tp=&arnumber=4669267>.*

Kurt R. Linberg, "Software developer perceptions about software project failure: a case study", [Online], 1999, pp. 177-192, [Retrieved from Internet on Dec. 11, 2015], <http://ac.els-cdn.com/S0164121299000941/1-s2.0-S0164121299000941-main.pdf>.*

Huy Nguyen et al., "Rapid Prototyping Technology", [Online], 2010, pp. 17-27, [Retrieved from Internet on Dec. 11, 2015], <http://citeseerx.ist.psu.edu/viewdoc/download?doi=10.1.1.187.1564&rep=rep1&type=pdf>.*

European Search Report dated Dec. 3, 2013 in corresponding European Patent Application 13188577.4.

* cited by examiner

AUTOMATIC TESTING APPARATUS FOR EMBEDDED SOFTWARE AND AUTOMATIC TESTING METHOD THEREOF

CROSS-REFERENCE TO RELATED APPLICATIONS

This application claims priority benefit from Korean Patent Application No. 10-2012-0119604, filed on Oct. 26, 2012 in the Korean Intellectual Property Office, the disclosure of which is incorporated herein by reference.

BACKGROUND

1. Field

Apparatuses and methods consistent with the exemplary embodiments relate to an automatic test apparatus for embedded software and an automatic testing method thereof, and more particularly to an apparatus and method to automate an operation test for embedded software installed in an electronic device.

2. Description of the Related Art

With emergence of a television (TV), a mobile phone, or the like various electronic devices such as digital devices, embedded software installed in such devices have become vast and various. A variety of devices provides various execution environments for the embedded software installed in the respective devices, and may cause errors. Thus, the embedded software may be previously tested in consideration of errors that may arise in executing the embedded software.

Under a host environment before porting to a target environment corresponding to a real environment, the embedded software is tested in accordance with various user scenarios based on many cases. The scenarios unfolded under the host environment may be reproduced under the target environment.

Since the embedded software may be ported to and operate in the target environment having various hardware characteristics and software environments and operates, embedded software may experience detailed and deep tests with regard to various scenarios before its development is completed. As such test methods, there is a conventional test method using a commercialized automated test tool for unidirectional transmission of command to the embedded software.

A plurality of electronic devices such as digital devices, loaded with the embedded software independently executes each embedded software while transmitting and receiving data through an communication interface. The respective embedded software may be different in characteristic from each other (e.g., different operating system (OS)), and therefore a problem may be caused by not only one embedded software but also interaction between a plurality of embedded software. In the latter case, difference in time of executing the respective embedded software, effects of the embedded software on the interface, etc. may cause various unexpected problems.

Accordingly, a conventional test based on unidirectional command transmission for single embedded software is difficult for reproduction about various problems that may occur in the interaction between the plurality of embedded software different in characteristic from each other, interface operations to transmit and receive data, and so on. Also, the conventional test is not flexible to various interface scenarios that may occur under conditions of end users, and thus costs much to secure the scenarios corresponding to various cases. Therefore, time and manpower are wasted, and an accurate test is difficult.

SUMMARY

Additional aspects and/or advantages will be set forth in part in the description which follows and, in part, will be apparent from the description, or may be learned by practice of the invention.

One or more exemplary embodiments may provide an automatic testing apparatus for embedded software, including: an output detector which collects interface status information in accordance with data transmission/reception from at least one of first and second electronic devices respectively loaded with first and second embedded software and exchanging data therebetween, and extracts a keyword from the collected interface status information; a scenario composer which uses identification information about the first and second embedded software and the extracted keyword, and composes a scenario corresponding to a predetermined event status; and a control command generator which generates a control command to control one of the first and second embedded software to reproduce the event status based on the composed scenario.

The control command may include identification information about one of the first and second embedded software, and may be transmitted to an electronic device loaded with an embedded software corresponding to the identification information.

The control command may include an execution command for the embedded software, and time information about the execution command.

The time information may reflect difference in time of executing the first and second embedded software in accordance with data transmission/reception of the first and second electronic devices.

The scenario composer may use the keyword as a condition, and compose a scenario corresponding to an event status satisfying the condition.

The composed scenario may include a predetermined-form programming language that uses at least one instruction included in the control command as an instruction for executing the embedded software.

The automatic testing apparatus may further include a storage unit which stores the composed scenario.

The automatic testing apparatus may further include first and second test processors which controls the first and second embedded software respectively perform a test of reproducing the event status under the control command.

The control command generator may compare the reproduction results with a previously composed scenario to determine whether an error occurs or not.

The control command generator may generate a control command to reproduce event statuses corresponding to a plurality of previously stored scenario in preset order or randomly.

The output detector, the scenario composer and the control command generator may be provided in a host apparatus connected to at least one of the first and second electronic devices.

One or more exemplary embodiments may provide an automatic testing method for embedded software, including: receiving interface status information in accordance with data transmission/reception from at least one of first and second electronic devices respectively loaded with first and second embedded software and exchanging data therebetween;

extracting a keyword from the received interface status information; composing a scenario corresponding to a predetermined event status by using identification information about the first and second embedded software and the extracted keyword; and generating a control command to control one of the first and second embedded software to reproduce the event status based on the composed scenario.

The control command may include identification information about one of the first and second embedded software, the method may further include transmitting the control command to a electronic device loaded with an embedded software corresponding to the identification information.

The control command may include an execution command for the embedded software, and time information about the execution command.

The time information may reflect difference in time of executing the first and second embedded software in accordance with data transmission/reception of the first and second electronic devices.

The composing the scenario may include using the keyword as a condition and composing a scenario corresponding to an event status satisfying the condition.

The composed scenario may include a predetermined-form programming language that uses at least one instruction included in the control command as an instruction for executing the embedded software.

The automatic testing method may further include storing the composed scenario.

The automatic testing method may further include controlling at least one of the first and second embedded software to perform a test of reproducing the event status under the control command.

The automatic testing method may further include determining whether an error occurs or not by comparing the reproduction results with a previously composed scenario.

The generating the control command may include generating a control command to reproduce event statuses corresponding to a plurality of previously stored scenario in preset order or randomly.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Figure 1:
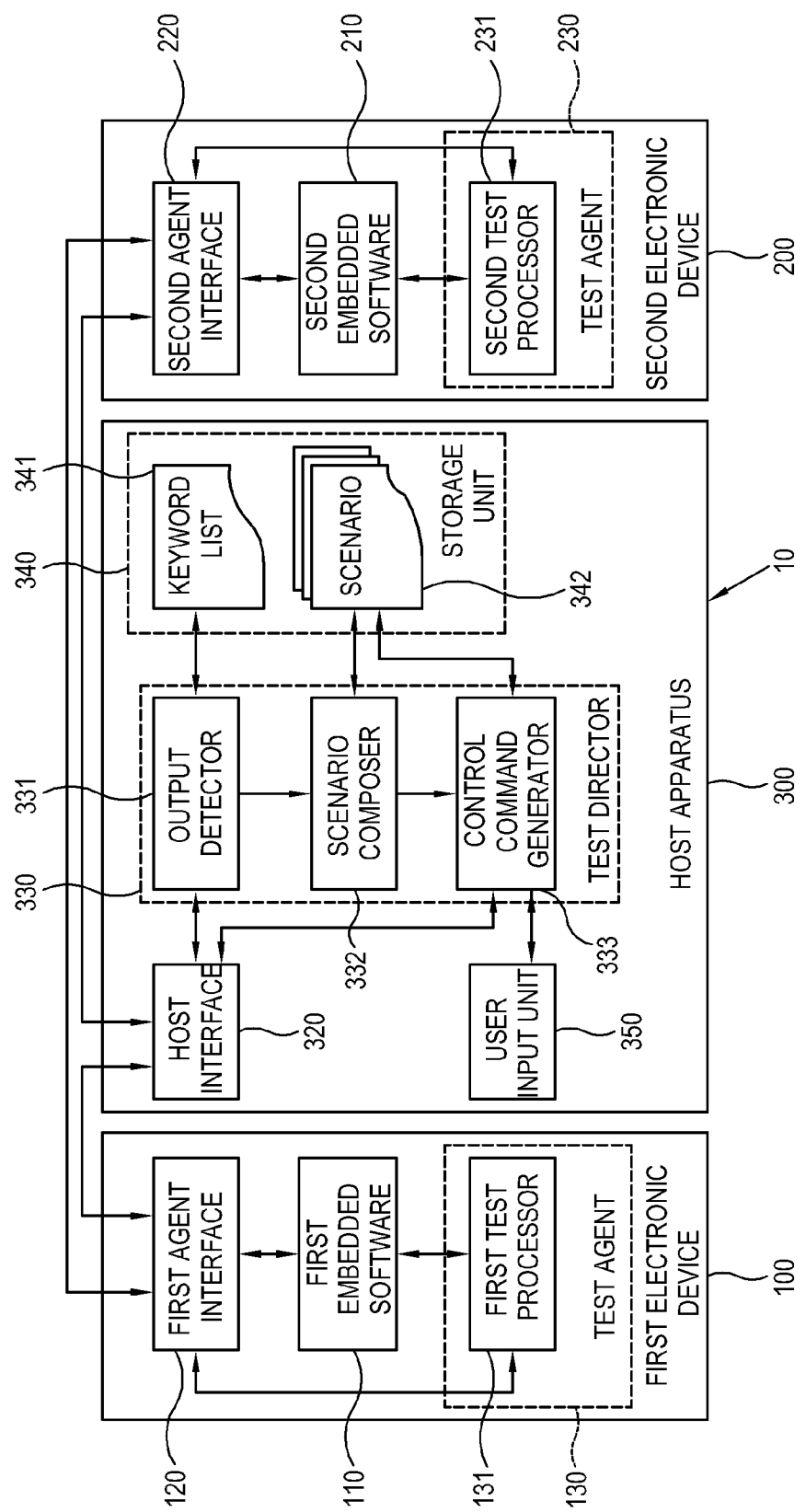
FIG. 1 is a block diagram showing a configuration of an automatic testing apparatus according to an exemplary embodiment.

Reference will now be made in detail to embodiments, examples of which are illustrated in the accompanying drawings, wherein like reference numerals refer to the like components throughout. Embodiments are described below to explain the present disclosure by referring to the figures.

FIG. 1 is a block diagram showing a configuration of an automatic testing apparatus according to an exemplary embodiment;

As shown in FIG. 1, an automatic testing apparatus 10 according to an exemplary embodiment includes a plurality of test agents 130, 230 and a test director 330.

The test agents 130, 230 are respectively installed in first and second electronic devices 100, 200 to be tested, and the test director 330 is installed in a host apparatus 300 which controls the overall testing process. The host apparatus 300 may be a computing device such as a personal computer (PC) or a server.

The first and second electronic devices 100, 200 perform data communication with each other through first and second agent interfaces 120, 220. The data communication may include wired communication and wireless communication. The first and second electronic devices 100, 200 may be, for example, a PC and an image processing device such as a monitor, an image processing device such as a TV and an audio dock (an audio output device), an image processing device such as TV and a remote controller, and so on. The first and second agent interfaces 120, 220 may include, for example, serial, Ethernet, High Definition Multimedia Interface (HDMI) and the like standard Input/Output (I/O) interfaces, and Bluetooth, radio frequency (RF) and the like wireless communication interfaces.

For example, if the embedded software respectively installed in an image processing apparatus such as a TV and the audio dock are tested, the TV and the audio dock may be connected to the PC in order to perform the test. At this time, the TV and the audio dock may correspond to the first and second electronic devices 100, 200, and the PC may correspond to the host apparatus 300. Also, the first and second electronic devices 100, 200 become targets as a real environment where the embedded software is finally installed and runs.

The first and second electronic devices 100, 200 in an embodiment may be various electronic devices such as a mobile phone, a portable terminal such as an MP3 player. If each of the electronic devices 100, 200 is the image processing apparatus, it may include an image processor to process an image signal received from an external image supplying source under a preset imaging process.

As shown in FIG. 1, the host apparatus 300 may further include a storage unit 340 to store non-limited data/information, and a user input unit 350 to allow a user to input his/her command.

The storage unit 340 may be for example, a non-volatile storage medium such as a flash memory, a hard disk drive, etc., and may be provided inside or outside the host apparatus 300. If the storage unit 340 is provide in the outside, a connector (not shown) may be provided to connect with the storage unit 340. The storage unit 340 is accessed by the test director 330, and data in the storage unit 340 may be accessed by performing an operation such as reading/recording/modification/deletion/update/etc. In an embodiment, the storage unit 340 may store and read a keyword list 341, and a plurality of scenarios 342.

The user input unit 350 may be for example, a keyboard, a mouse, a graphic user interface (GUI), a touch screen and etc. In an embodiment, the test director 330 may test embedded software 110, 210 based on a user command input through the user input unit 350. The test may include tests for events that are generated while transmitting and receiving data of the first and second electronic devices 100, 200.

The storage unit 340 and the user input unit 350 may be included in the automatic testing apparatus according to an exemplary embodiment.

In an embodiment, the host apparatus 300 and the first and second electronic devices 100, 200 perform data communication with each other, and automatically test the first and second embedded software 110, 210. The data communication may include wired communication and wireless communication. The host interface 320 may include for example, serial, Ethernet, High Definition Multimedia Interface (HDMI) and the like standard Input/Output (I/O) interfaces, and Bluetooth, radio frequency (RF) and the like wireless communication interfaces, be connected to the first and second agent interfaces 120, 220.

The test agents 130, 230 provided in the first and second electronic devices 100, 200 provide environments to implement the tests in the first and second electronic devices 200. For example, first and second embedded software 110, 210 installed in the first and second electronic devices 100, 200, respectively, may be implemented by the test agents 130, 230 under each test scenario. The test agents 130, 230 may be a processing unit such as a control processing unit (CPU), a micro control unit (MCU), etc., thereby controlling the functions of the first and second electronic devices 100, 200 or providing a user interface (UI).

In an embodiment, the test agents 130, 230 may include test processors 131, 231 to process the embedded software 110, 210 to reproduce predetermined event statuses based on the instruction list generated by the test director 330.

The test director 330 is a test management engine to control the test agents 130, 230 to perform a test so that the embedded software 210 may reproduce a predetermined event. The test director 330 transmits a command such as start, stop, complete and etc. so that the test agents 130, 230 may start, stop, complete and etc. the test, and thus the test agents 130, 230 perform each test by reproducing a corresponding event status in response to the received command.

The test director 330 in an embodiment may be, for example, the CPU, the MCU, etc., and controls operations of the host apparatus 300. For example, the test director 330 controls data communication through the host interface 320, and performs operations corresponding to a user's command input through the user input unit 350.

The test director 330 is reported about a test running state or a test running result from the test agents 130, 230, and monitors it. The monitoring may include generally managing a test status and creating a report, or controlling the test if the test is not smoothly processed. For example, the test agents 130, 230 may report the running results to the test director 330 every time when each event reproduction is completed. If the test director 330 is not reported about the event reproduction within a preset time, it determines that an error occurs, and commands the test agents 130, 230 to create a report about a hitherto running result or resume the corresponding event.

The test director 330 in an embodiment builds the test agents 130, 230 and the embedded software 110, 210 together, and ports them to the electronic device 100. In order to run the test, the test director 330 may transmit individual instruction lists to the first and second electronic devices 100, 200 through the host interface 320, and the first and second agent interfaces 130, 230 so that the embedded software 210 may reproduce various event statuses.

Hereinafter, detailed testing operations of the test director 330 and the test agents 130, 230 will be described with reference to FIG. 1.

As shown in FIG. 1, the test director 330 includes an output detector 331, a scenario composer 332, and a control command generator 333.

The output detector 331 collects interface status information through the host interface 320 in accordance with the data communication in the first and second agent interfaces 120, 220 as the first and second embedded software 110, 210 are executed. Here, the first and second embedded software 110, 210 may be executed under the control of the test agents 130, 230, and the interface status information may be saved a log file where a history of transmitting and receiving data between the first and second agent interfaces 120, 220 as the embedded software 110, 210 are executed.

Figure 2:
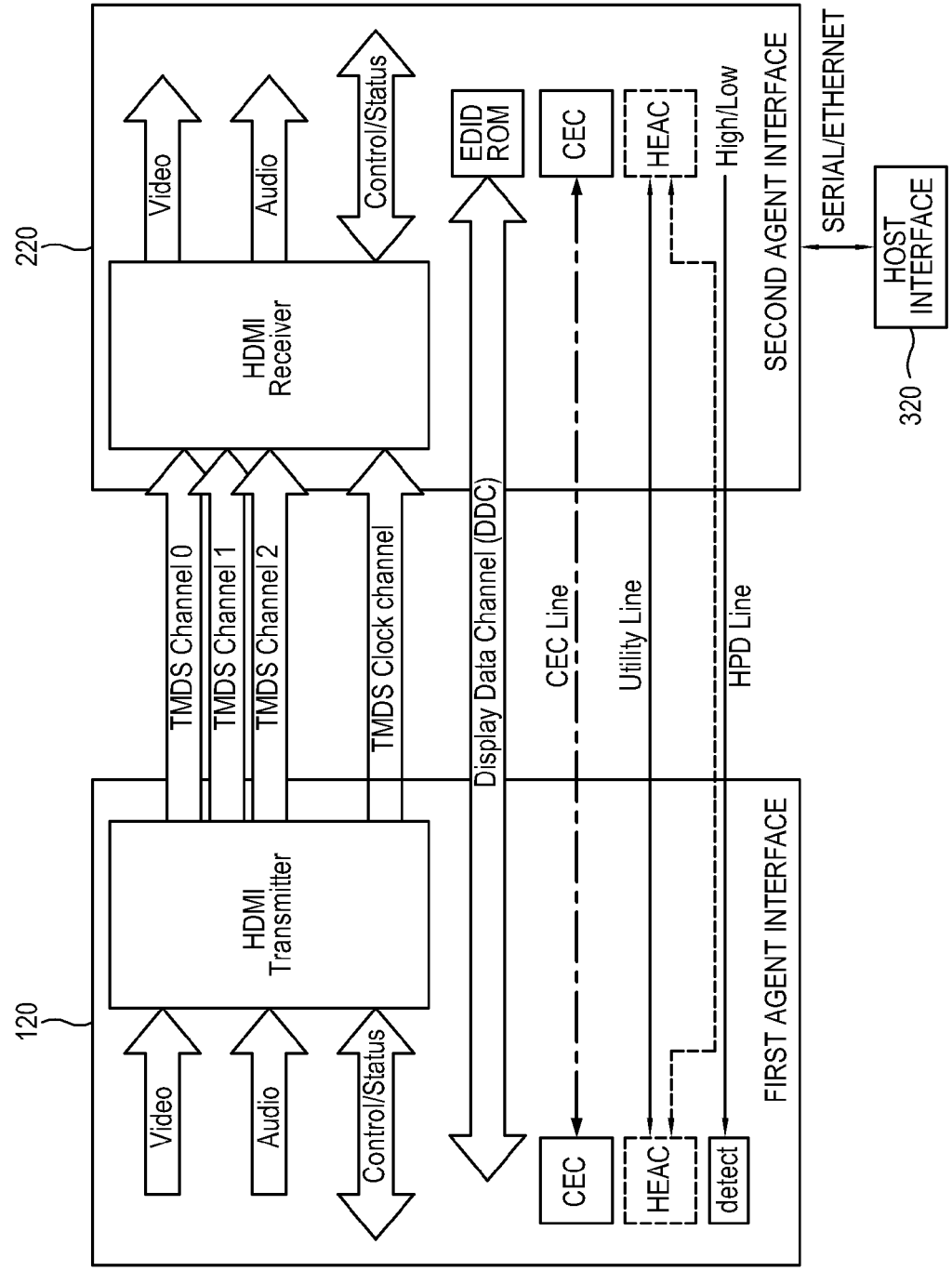
FIG. 2 is a view showing an example where interface status information is received according to an exemplary embodiment.

FIG. 2 is a view showing an example where interface status information is received according to an exemplary embodiment.

As shown in FIG. 2, the first and second agent interfaces 120, 220 may be for example, HDMI interfaces. For example, if the first electronic device 100 is a PC and the second electronic device 200 is an image processing device such as a monitor, various data (video/audio signals, control/state information, etc.) may be transmitted and received through the HDMI interface between them.

In this case, data (instruction and information) transmitted and received through a Consumer Electronics Control (CEC) line may be received as interface status information through the host interface 320. CEC is an HDMI feature designed to allow the user to command and control a plurality of CEC-enabled devices that are connected through HDMI by using only one of their remote controls The host interface 320 in an embodiment may be connected to one of the first and second agent interfaces 120, 220, and receive the interface status information. That is, the first and second agent interfaces 120, 220 transmit and receive data between them, and all transmitted and received data is recorded as inputs or outputs in one of the first and second agent interfaces 120, 220, so that one agent interface is enough to collect all transmitted and received the interface status information.

The embodiment of FIG. 2 shows an example where the host interface 320 is connected to the second agent interface 220 of the second electronic device 200 and receives the interface status information, but not limited thereto. Alternatively, the present disclosure may include that the host interface 320 is connected to the first agent 120 of the first electronic device 100 and receives the interface status information, and include that the host interface 320 receives the interface status information from both the first and second agent interfaces 120, 220.

The output detector 331 extracts a keyword from the collected interface status information, and composes a keyword list 331 based on the extracted keyword list 331. The composed keyword list 331 is stored in the storage unit 340. Also, the collected interface status information includes interface status information output in accordance with events reproduced by the first and second embedded software 110, 210 based on a control command to be described later.

The scenario composer 332 analyzes the output (standard output) from execution of the embedded software 110, 210 based on the composed keyword list 331. Here, the keyword list 331 is used to analyze the status of the first and second embedded software 110, 210 in real time.

The scenario composer 332 generates at least one scenario 342 corresponding to a predetermined event based on identification information about the first and second embedded software 110, 210 and the keyword extracted by the output detector 331 in accordance with the analyzed results of the output analyzer 142. The scenario composer 332 determines true/false by using the extracted keyword as a condition (status condition or an inquiry), and loads a scenario corresponding to an event status satisfying the corresponding condition.

For example, if the first electronic device 100 is a TV and the second electronic device 200 is a remote controller, the first and second agent interfaces 120, 220 may be achieved by, for example, Bluetooth communication modules. The host interface 300 may be connected to the second agent interface 220 of the second electronic device 200 through Serial, Ethernet, HDMI and etc, and receive the interface status information. The output detector 331 collects the received interface status information and extracts a keyword. Specifically, if 'power on' and 'play' are sequentially extracted as keywords, for example, the output detector 141 composes the keyword list 331 including 'play (keyword A)' and uses and analyzes the keyword list 331 as an output to play an audio file. The scenario composer 332 may load a scenario (for convenience, called a scenario A), which records a broadcast of a selected channel, as one of event statuses on conditions of playing. Here, the scenario composer 332 may load a plurality of scenarios (the scenario A, B, . . . N) related to the channel in preset order or randomly.

The scenario composer 332 in an embodiment may compose a scenario about a predetermined event status, using identification (ID) information about the first and second embedded software 110, 210 and the keywords of the keyword list 331. The ID information is determined using information indicating whether the extracted keyword is transmission data or reception data.

The control command generator 333 generates a control command to control one of the first and second embedded software 110 and 210 to reproduce a predetermined event status, based on the composed scenario. That is, the control command generator 333 generates an instruction list containing an instruction corresponding to a relevant event status, using the composed scenario.

For example, if the scenario A is loaded, the control command generator 333 may generate a control command A including an instruction corresponding to the event where the second embedded software 210 transmits a command to select a channel to the TV and transmits a command to record the selected channel. Also, the control command generator 333 may generate a control command A' including an instruction corresponding to the event where the first embedded software 110 receives the channel selecting command from the remote controller so as to tune to the channel and receives the recording command for the tuned channel so as to record a corresponding broadcast.

The generated control commands A, A' respectively contain identification information about one of the first and second embedded software 110, 210, and are transmitted to the electronic devices loaded with the embedded software corresponding to the relevant identification information.

Thus, the control command A contains the identification information (ID 2) of the second embedded software 210, and is transmitted to the second electronic device (e.g., the remote controller) 200 loaded with the second embedded software 210. Also, the control command A' contains the identification information (ID 1) of the first embedded software 110, and is transmitted to the first electronic device 100 loaded with the first embedded software 110.

The generated control commands A, A' include a command for executing the embedded software 110, 210, and time information about the execution command. In an embodiment, the time information reflects difference in time of executing the first and second embedded software 110, 210 in accordance with the data transmission/reception of the first and second electronic devices 100, 200.

For example, the first embedded software 100 may reflect the time difference considering time taken in a user's input using the remote controller, while reproducing power-on, channel-tuning and recording in sequence, in order to reproduce the event under the control command A'. In an embodiment, information about transmitting/receiving interface status information obtained from the second agent interface 220 may be used to determine time information of each execution command.

The generated control commands A, A' are respectively transmitted to the first and second test processors 131, 231 of the test agents 130, 230 loaded in the electronic device 200 through the host interface 320. Here, the control command A and the control command A' are transmitted independently of each other.

The first test processor 131 controls the first embedded software 110 to perform a test for reproduction of the corresponding event status (tuning a channel and recording for the tuned channel), based on the received control command A. The second test processor 231 controls the second embedded software 210 to perform a test for reproduction of the corresponding event status (selecting a channel, and receiving a user's command of recording for the tuned channel and transmitting it to the TV), based on the received control command A'.

The interface status information from the reproduction results is transmitted to the host apparatus 300 through the first and second agent interfaces 120, 220 in the form of a log file. The log file may be saved in the storage unit 342.

As described above, the output detector 331 collects the status information based on the reproduction results, and the control command generator 333 analyzes an output through the collected interface status information and determines whether there is an error in the results of the event reproduction. The control command generator 333 may compare the event reproduction results with the previously composed scenario 342 so as to determine whether there is an error.

Further, the control command generator 333 may update the instruction list by branching an instruction corresponding to a new event status in accordance with whether the error occurs or not, and thus generate a new control command.

For example, if there is no error as a result from an event A or A' of selecting a channel and reproducing the selected channel, another scenario on a condition of keyword A (channel) (e.g., a scenario (for convenience, called a scenario B) that sets up the selected channel as a favorite channel) is composed, and the composed scenario B is used to generate control commands B, B' corresponding to the events B, B' of setting up the selected channel as the favorite channel. Here, the event B is an event to receive a user's input to set up the favorite channel through the remote controller, and the event B' is an event where the TV sets up and stores the favorite channel in accordance with a user's input.

The generated control commands B, B' are transmitted to the first and second electronic devices 100, 200 via the host interfaces 320, and the first and second test processors 131, 231 control the first and second embedded software 110, 210 to perform a test for reproduction of the corresponding event status (e.g., the event B and the event B') based on the respectively received control commands B, B'.

The control command generator 333 may terminate the test of the first and second embedded software 110, 210 if the analyzed result of the output analyzer 142 shows an error in the event reproduction. Here, a developer may select whether to terminate the test through the user input unit 350. The termination of the test may also be automatically performed.

If it is selected to terminate the test, a developer may perform an analysis to solve the error that occurs while executing the first and second embedded software 110, 210.

On the other hand, if it is selected not to terminate the test, the test director 330 continues to collect and extract the keywords based on the interface status information received through the host interface 320.

Thus, the automatic testing apparatus according to an exemplary embodiment sequentially or randomly executes various events in accordance with the status information of the embedded software 210, and previously detects predictable or unpredictable various problems that may arise under user conditions, thereby reproducing them.

Also, various events are branched in accordance with determination about whether a status condition about the extracted keyword is true/false, thereby performing repetitive tests.

The scenario composed in the scenario composer 332 may be stored in the storage unit 250. The scenario in an embodiment includes a predetermined-form programming language (hereinafter, referred to as a "scenario language") that uses at least one instruction included in the instruction list as an instruction to execute the first and second embedded software 110, 120. The programming language may use the interface status information (<keyword A>, <keyword B>) of the embedded software 110, 210 as conditions, and support at least one of a multiple selective sentence (case <keyword C> call <the scenario C>, case <keyword D> call <the scenario D>, case <keyword E> call <the scenario E>), repetitive sentence (Repeat <number of repeat times>), and a comparative sentence (if status determination? Success: failure).

In an embodiment, the scenario (scenarios A, B, . . . , N) is composed so that the embedded software 110, 210 may perform an automatic test in consideration of each case that may occur in the first and second embedded software 110, 210 under a condition of the keyword based on the interface status information of the first and second embedded software 110, 210.

While the scenario 342 is branched in accordance with conditions, a new scenario is continuously composed until a developer issues a command to stop composing the scenario (or terminating a test).

The test agents 130, 230 in an embodiment may report an event running status or result to the test director 330. The test director 330 may be reported about a test operating status or result from the test agents 130, 230, and create a report on managing a general test status or a report that the test is not smoothly proceeded. The developer ascertains the report and confirms an automatic test result about the first and second embedded software 110, 210.

Hereinafter, the automatic testing method for the embedded software and the scenario composing method will be described with reference to FIGS. 3 and 4.

Figure 3:
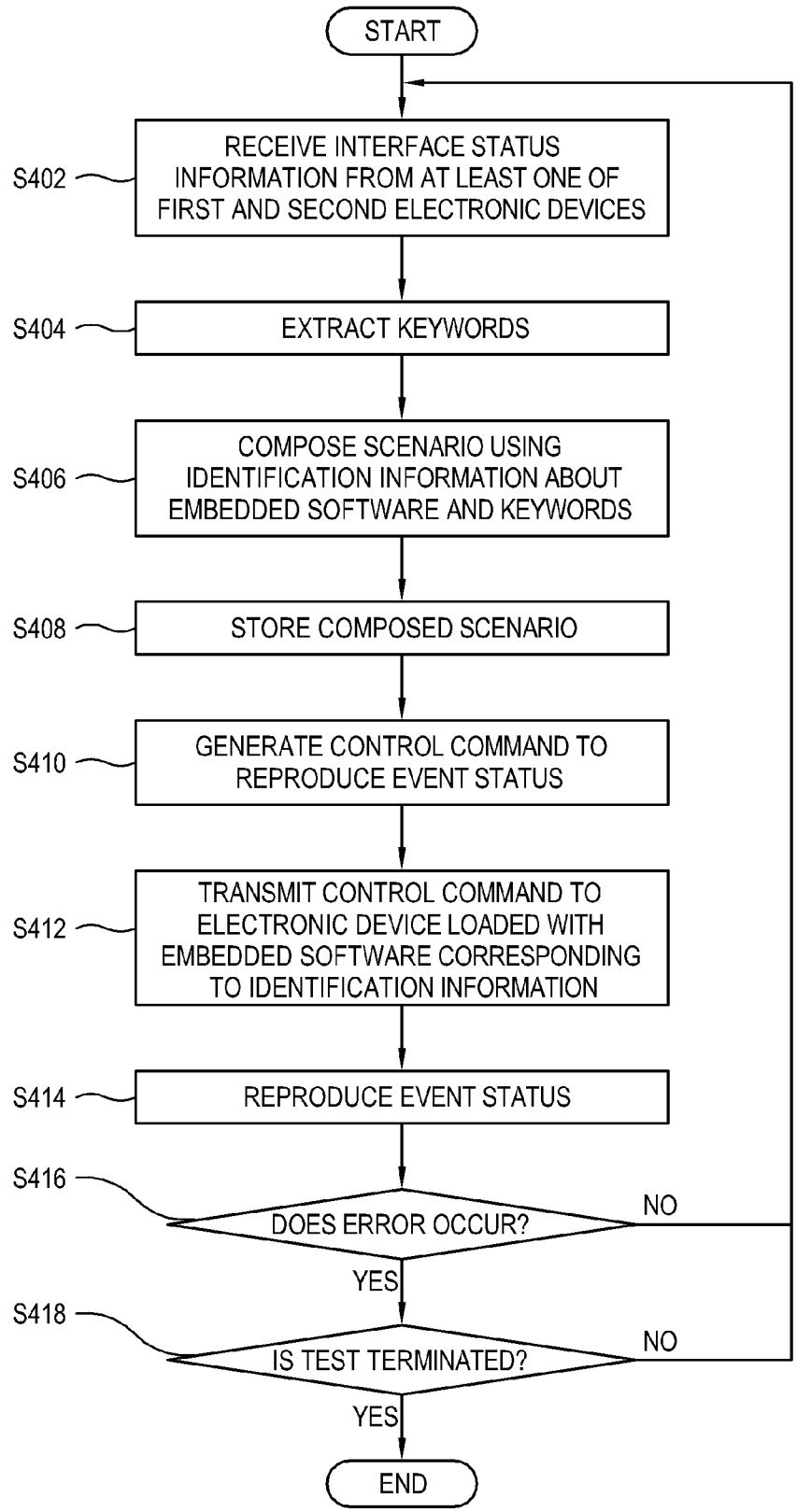
FIG. 3 is a flowchart showing an automatic testing method of embedded software according to an exemplary embodiment.

FIG. 3 is a flowchart showing an automatic testing method of embedded software according to an exemplary embodiment.

As shown in FIG. 3, the output detector 331 executes the first and second embedded software 110, 210 and receives the output interface status information (S402). Here, the interface status information may be collected from either of the first or second agent interface 120, 220 connected to the host interface 320.

The output detector 331 extracts a keyword from the interface information received at the operation S402 (S404). The extracted keyword may be stored in the keyword list 341 in the storage unit 340.

The scenario composer 332 composes a scenario corresponding to a predetermined event status, using identification information of the first and second embedded software 110, 210 and the keyword extracted at the operation S404 (S406). Here, the scenario composer 332 uses the keyword extracted at the operation S404 as a condition (inquiry) to determine the true/false (YES/NO), and generates a scenario satisfying the corresponding conditions.

The scenario 342 composed at the operation S406 may be stored in the storage unit 340 (S408).

Further, the control command generator 333 uses the scenario stored in the operation S408 to generate a control command to reproduce a predetermined event status (S410). The generated control command may include identification information showing one of the first and second embedded software 110, 210, and an instruction to execute the embedded software, and time information about the instruction (e.g., difference in time of executing the instruction).

The control command generated at the operation S410 is transmitted to the electronic device 100 or 200 loaded with the embedded software 210 or 220 corresponding to the included identification information (S412).

The first test processor 131 or the second test processor 231 controls the first or second embedded software 110, 210 to reproduce a predetermined event status in accordance with the received control command (S414).

The interface status information based on the event reproduction at the operation S414 is collected in the output detector 331, and a keyword is extracted. The control command generator 333 uses the extracted keyword to compare the reproduction result with the previously composed scenario 342, thereby determining whether the error occurs or not based on the event reproduction (S416).

If it is determined that an error occurs in the operation S416, a developer may select whether to terminate the test (S418).

If it is determined that an error does not occur in the operation S416 and it is selected not to terminate the test in the operation S418, the operations S402 to S414 are repetitively performed to branch a command corresponding to a new event status and update the scenario 342. In such a manner, various events are reproduced so that the plurality of embedded software installed in the plurality of electronic devices connected by interfaces may be automatically tested.

Figure 4:
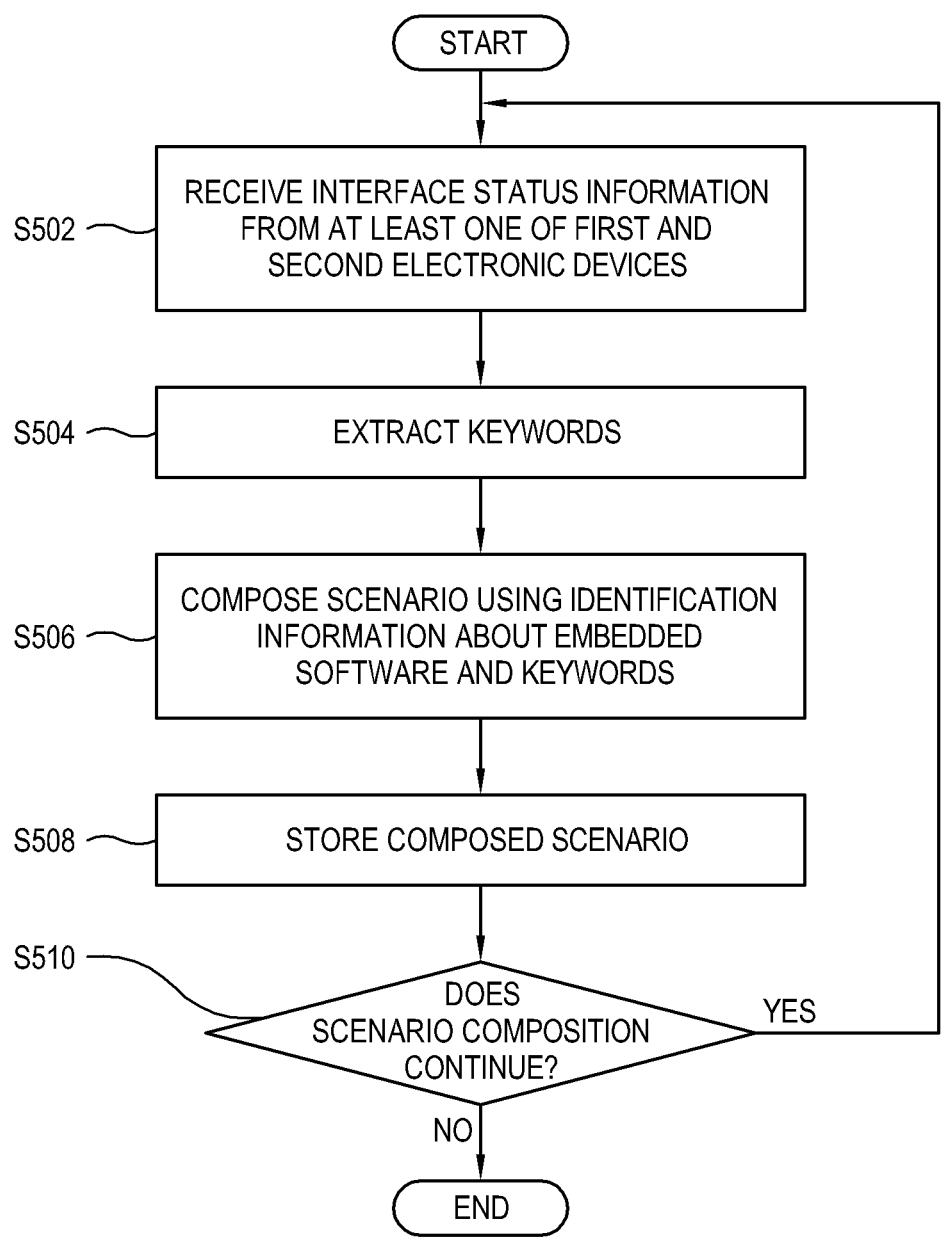
FIG. 4 is a flowchart showing a test scenario composing method of the embedded software according to an exemplary embodiment.

FIG. 4 is a flowchart showing a test scenario composing method of the embedded software according to an exemplary embodiment.

As shown in FIG. 4, the output detector 331 executes the first and second embedded software 110, 210 and receives the output interface status information (S502). Here, the interface status information may be collected from either of the first or second agent interface 120, 220 connected to the host interface 320.

The output detector 331 extracts a keyword from the interface information received at the operation S502 (S504). The extracted keyword may be stored in the keyword list 341 in the storage unit 340.

The scenario composer 332 composes a scenario corresponding to a predetermined event status, using identification information of the first and second embedded software 110, 210 and the keyword extracted at the operation S504 (S506). Here, the scenario composer 332 uses the keyword extracted at the operation S504 as a condition (inquiry) to determine the trueness/falseness (YES/NO), and generates a scenario satisfying the corresponding conditions.

The scenario 342 composed at the operation S506 may be stored in the storage unit 340 (S508).

The scenario composer 332 may be selected by a developer whether to continue to compose the scenario (S510). In accordance with the selection results in the operation S510, the scenario is branched in accordance with conditions and thus new scenarios are continuously composed. Here, the scenario may be composed until a developer issues a command to stop composing the scenario (or terminate the test).

According to an exemplary embodiment, the automatic test apparatus executes the plurality of embedded software different in characteristic from one another and uses the output interface status information as the inquiries, thereby sequentially or randomly executing various events. Therefore, it is possible to previously detect unpredictable problems as well as predictable problems that may occur in interaction between the plurality of embedded software, interface operation to transmit and receive data, etc., and thus reproduce them.

Also, various events are branched in accordance with the determination of true/false about the status conditions of the extracted keyword, thereby repetitively performing the automatic test with respect to the plurality of embedded software.

Further, the test scenario is branched on conditions and new scenarios are continuously composed until a developer issues a command to stop composing the scenario, thereby securing various test scenarios.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An automatic testing method for embedded software, comprising:
   receiving interface status information from at least one of first and second electronic devices respectively loaded with first and second embedded software and exchanging data therebetween, the interface status information being output by data transmission or reception between the first electronic device and the second electronic device and received through an interface of the automatic testing apparatus connected to at least one of a first interface of the first electronic device and a second interface of the second electronic device and the interface status information being saved as a log file;
   extracting a keyword from the received interface status information;
   composing a scenario corresponding to a predetermined event based on identification information on the first and second embedded software, and the extracted keyword; and
   generating a control command to control one of the first and second embedded software to reproduce the predetermined event based on the composed scenario,
   wherein the control command comprises an execution command for the embedded software, and time information about the execution command, the time information reflecting difference in time of executing the first and second embedded software in accordance with data transmission or reception of the first electronic device and second electronic device.

2. The automatic testing method according to claim 1, wherein the control command comprises identification information about one of the first and second embedded software, the method further comprising transmitting the control command to a electronic device loaded with an embedded software corresponding to the identification information.

3. The automatic testing method according to claim 1, wherein the composing the scenario comprises using the keyword as a condition and composing a scenario corresponding to an event satisfying the condition.

4. The automatic testing method according to claim 3, wherein the composed scenario comprises a predetermined-form programming language that uses at least one instruction included in the control command as an instruction to execute the embedded software.

5. The automatic testing method according to claim 4, further comprising storing the composed scenario.

6. The automatic testing method according to claim 1, further comprising controlling at least one of the first and second embedded software to perform a test of reproducing the predetermined event under the control command.

7. The automatic testing method according to claim 6, further comprising determining whether an error occurs or not by comparing the reproduction results with a previously composed scenario.

8. The automatic testing method according to claim 1, wherein the generating the control command comprises generating a control command to reproduce a plurality of events corresponding to a plurality of previously stored scenario in preset order or randomly.

9. The automatic testing method according to claim 1, wherein the identification information is determined using information indicating whether the extracted keyword is transmission data or reception data.

10. An automatic testing apparatus having executable instructions stored in a memory for testing embedded software, comprising:
    an output detector which collects interface status information from at least one of first and second electronic devices respectively loaded with first and second embedded software and exchanging data therebetween, and extracts a keyword from the collected interface status information, the interface status information being output by data transmission or reception between the first electronic device and the second electronic device and received through an interface of the automatic testing apparatus connected to at least one of a first interface of the first electronic device and a second interface of the second electronic device and the interface status information being saved as a log file;
    a scenario composer which composes a scenario corresponding to a predetermined event based on identification information on the first and second embedded software, and the extracted keyword; and
    a control command generator which generates a control command to control one of the first and second embedded software to reproduce the predetermined event based on the composed scenario,
    wherein the control command comprises an execution command for the first and second embedded software, and time information about the execution command, the time information reflecting difference in time of executing the first and second embedded software in accordance with data transmission or reception of the first electronic device and second electronic device.

11. The automatic testing apparatus according to claim 10, wherein the control command comprises identification information about one of the first and second embedded software, and is transmitted to a electronic device loaded with an embedded software corresponding to the identification information.

12. The automatic testing apparatus according to claim 10, wherein the scenario composer uses the keyword as a condition, and composes a scenario corresponding to an event status satisfying the condition.

13. The automatic testing apparatus according to claim 12, wherein the composed scenario comprises a predetermined-form programming language that uses at least one instruction included in the control command as an instruction for executing the embedded software.

14. The automatic testing apparatus according to claim 12, further comprising a storage unit which stores the composed scenario.

15. The automatic testing apparatus according to claim 10, further comprising first and second test processors which controls the first and second embedded software respectively to perform a test of reproducing the predetermined event under the control command.

16. The automatic testing apparatus according to claim 15, wherein the control command generator compares the reproduction results with a previously composed scenario to determine whether an error occurs or not.

17. The automatic testing apparatus according to claim 10, wherein the control command generator generates a control command to reproduce a plurality of events corresponding to a plurality of previously stored scenario in preset order or randomly.

18. The automatic testing apparatus according to claim 10, wherein the output detector, the scenario composer and the control command generator are provided in a host apparatus connected to at least one of the first and second electronic devices.

19. The automatic testing apparatus according to claim 10, wherein the identification information is determined using information indicating whether the extracted keyword is transmission data or reception data.

* * * * *